United States Patent [19]

Yamada

[11] Patent Number: 4,504,960
[45] Date of Patent: Mar. 12, 1985

[54] DATA READING APPARATUS FOR DATA TRANSMISSION

[75] Inventor: Yasuhiro Yamada, Fussa, Japan

[73] Assignee: Victor Company of Japan, Ltd., Yokohama, Japan

[21] Appl. No.: 398,366

[22] Filed: Jul. 14, 1982

[30] Foreign Application Priority Data

Jul. 17, 1981 [JP] Japan .............................. 56-111652

[51] Int. Cl.³ .............................................. H04L 7/06
[52] U.S. Cl. ...................................... 375/94; 329/104; 328/155
[58] Field of Search ................... 375/94, 95, 106, 110, 375/113; 364/178; 307/269, 590; 328/63, 72, 155; 329/104

[56] References Cited

U.S. PATENT DOCUMENTS

| | | | |
|---|---|---|---|
| 3,549,804 | 12/1970 | Greenspan | 375/95 |
| 3,764,989 | 10/1973 | McClellan | 370/112 |
| 3,921,076 | 11/1975 | Currie | 375/95 |
| 3,986,126 | 10/1976 | Gindi et al. | 307/269 |
| 4,242,755 | 12/1980 | Gauzan | 375/95 |

FOREIGN PATENT DOCUMENTS

| | | |
|---|---|---|
| 2244305 | 9/1974 | France . |
| 1029940 | 5/1963 | United Kingdom . |
| 1242576 | 8/1971 | United Kingdom . |
| 1585080 | 2/1981 | United Kingdom . |
| 1590408 | 6/1981 | United Kingdom . |
| 2091522 | 7/1982 | United Kingdom . |

OTHER PUBLICATIONS

IBM Technical Disclosure Bulletin, vol. 17, No. 1, 6/74, pp. 206–207.
IBM Technical Disclosure Bulletin, vol. 13, No. 10, 3/71, pp. 2873–2876.

*Primary Examiner*—Robert L. Griffin
*Assistant Examiner*—Stephen Chin
*Attorney, Agent, or Firm*—Posnack, Roberts, Cohen & Spiecens

[57] ABSTRACT

A data reading apparatus for data transmission, for reading digital data from a digital signal series obtained by comparing the level of an incoming transmission signal obtained through a transmission path with a reference level at a detector, comprises a reference clock pulse generator for generating a reference clock pulse having a period equal to substantially 1/M of a transmission digit period of the digital signal series, a detecting circuit supplied with the digital signal series and the reference clock pulse generated by the reference clock pulse generator, for generating a level variation detection pulse in phase synchronism with level varying points corresponding to rising edges and/or falling edges of the digital signal series, a frequency dividing circuit reset by the level variation detection pulse from the detecting circuit, for generating a data reading timing clock pulse with a period substantially equal to the digit period of the digital signal series and with a phase delayed with respect to the level variation detection pulse, by frequency-dividing the reference clock pulse from the reference clock pulse generator, and a data reading circuit for obtaining a data reading output signal by latching the digital signal series by the data reading timing clock pulse obtained from the frequency dividing circuit.

4 Claims, 11 Drawing Figures

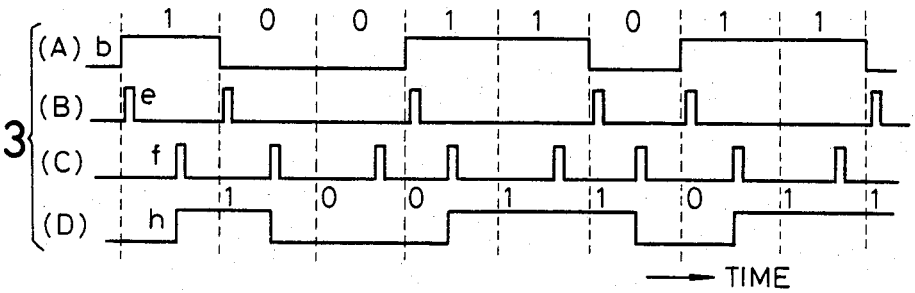
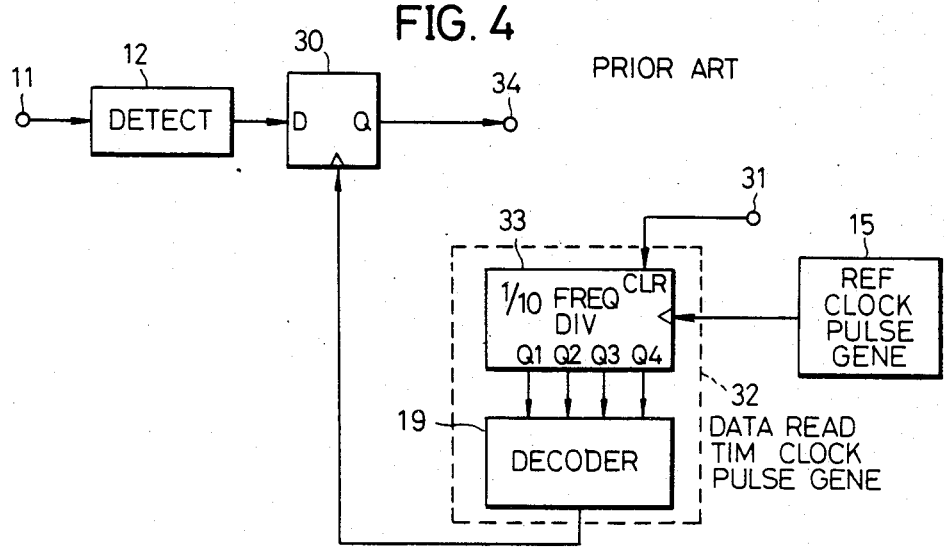
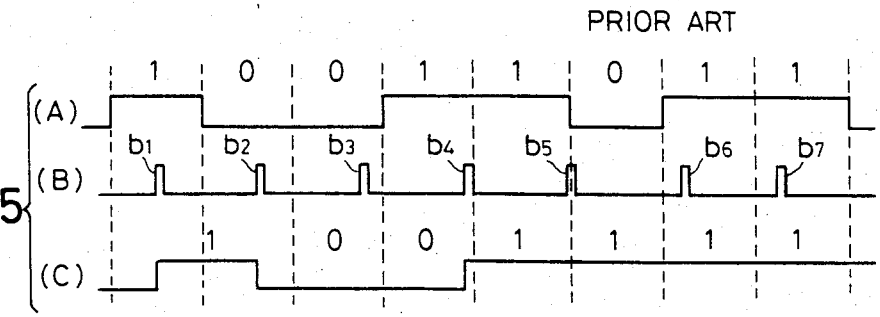

DATA READING APPARATUS FOR DATA TRANSMISSION

BACKGROUND OF THE INVENTION

The present invention generally relates to data reading apparatuses for data transmission, and more particularly to a data reading apparatus capable of accurately reading digital data even if jitter exists in the digital data.

When transmitting an analog information signal, the analog information signal is subjected to digital pulse modulation and converted into a digital data. The digital data is divided into predetermined sections, and a signal in each predetermined section is added with a synchronizing signal having a fixed pattern, and often further added with a code error detection signal and a code error correction signal. Such a digital data divided into the predetermined sections and added with the above signals, is transmitted time serially. The digital signal series is subjected to modulation such as frequency modulation and phase modulation, and transmitted to a transmission path such as a magnetic tape. The digital signal series thus obtained through the transmission path, is supplied to a receiving apparatus (or a reproducing apparatus). If the received signal is modulated upon transmission, the receiving apparatus first demodulates the received signal, and waveform equalization is performed at an equalizer so that the total impulse response becomes zero in the Nyquist interval. The signal thus subjected to waveform equalization at the equalizer so that intersymbol interference does not occur, is supplied to a level comparator (detector) wherein the signal level is compared with a reference level and converted into a two-valued digital signal series. The two-valued digital signal series is supplied to a synchronizing signal detecting circuit and a data reading apparatus.

The above synchronizing signal detecting circuit detects a synchronizing signal within the digital signal series, and supplies an output detection signal to the data reading apparatus. The data reading apparatus comprises a reference clock generator, a data reading timing clock generator, and a data reading circuit. This data reading apparatus reads the digital data transmitted in succession to the above synchronizing signal at the data reading circuit, by a data reading timing clock pulse formed from the above synchronizing signal detection signal and a reference clock pulse obtained from the reference clock generator.

The reference clock generator generates a reference clock pulse having a transmission bit rate N, where N is an integer greater than or equal to two. Because the reference clock pulse and the transmitted digital data are in a non-synchronous relationship, the data reading timing clock pulse formed by counting the reference clock pulse and the digital data gradually become out of phase if jitter and the like introduced in the transmission path exists within the digital data. Hence, in the conventional data reading apparatus, the data reading clock pulse becomes generated at a point when there is an incoming digital data of a bit adjacent to the bit which is to be read originally, when the data reading timing clock pulse and the digital data become out of phase to a certain extent. In such a case, the data reading apparatus reads the digital data of the bit adjacent to the bit which is to be read originally, and there was a disadvantage in that erroneous data reading operations could occur.

SUMMARY OF THE INVENTION

Accordingly, it is a general object of the present invention to provide a novel and useful data reading apparatus for data transmission, in which the above described disadvantages have been overcome.

Another and more specific object of the present invention is to provide a digital data reading apparatus in which, a level variation detection pulse having a phase in accordance with a level variation in a digital signal series is generated, the generated level variation detection pulse resets frequency dividing means, and the frequency dividing means generates a data reading timing clock pulse with a period substantially equal to a bit period of the digital signal series and with a phase lagging the level variation detection pulse by a predetermined phase, so that the digital data reading apparatus reads the digital data of the above digital signal series. According to the data reading apparatus of the present invention, the frequency dividing means is reset every time there is level variation in the digital signal series. Hence, if jitter exists within the digital signal series, the phase of the reading timing clock pulse varies according to the jitter, to permit accurate reading of the digital data even when the above jitter exists.

Still another object of the present invention is to provide a data reading apparatus in which a phase error of a data reading timing clock pulse with respect to a level variation detection pulse is variably controlled according to a reading output signal of a digital data in a bit immediately preceding an arbitrary bit, so that the data reading timing clock pulse is always generated with a phase substantially corresponding to a center position of each bit of the digital data regardless of the value of the digital data in the above bit immediately preceding the arbitrary bit.

Another object of the present invention is to provide a data reading apparatus provided with gating means for generating a gating signal which predicts generation points of the above level variation detection pulse, and limiting supply of the level variation detection pulse to the above frequency dividing means. According to the apparatus of the present invention, even if noise becomes mixed within the transmission signal in the transmission path, or the level variation detection pulse becomes out of phase from the original phase due to level variation in the transmission signal, the supply of the out-of-phase level variation detection pulse to the frequency dividing means can be interrupted by the above gating means. Thus, the frequency dividing means is provided from performing an erroneous operation such as an operation in which the data reading timing clock pulse is generated twice within the interval until the frequency dividing means is reset.

Other objects and furter features of the present invention will be apparent from the following detailed description when read in conjunction with the accompanying drawings.

BRIEF DESCRIPTION OF THE DRAWINGS

FIGS. 3(A) through 3(D) are graphs respectively showing signal waveforms at each part of the circuit system shown in FIG. 1;

FIG. 4 is a systematic circuit diagram showing a conventional data reading apparatus;

FIGS. 5(A) through 5(C) are graphs respectively showing signal waveforms at each part of the circuit system shown in FIG. 4;

DETAILED DESCRIPTION

Figure 1:
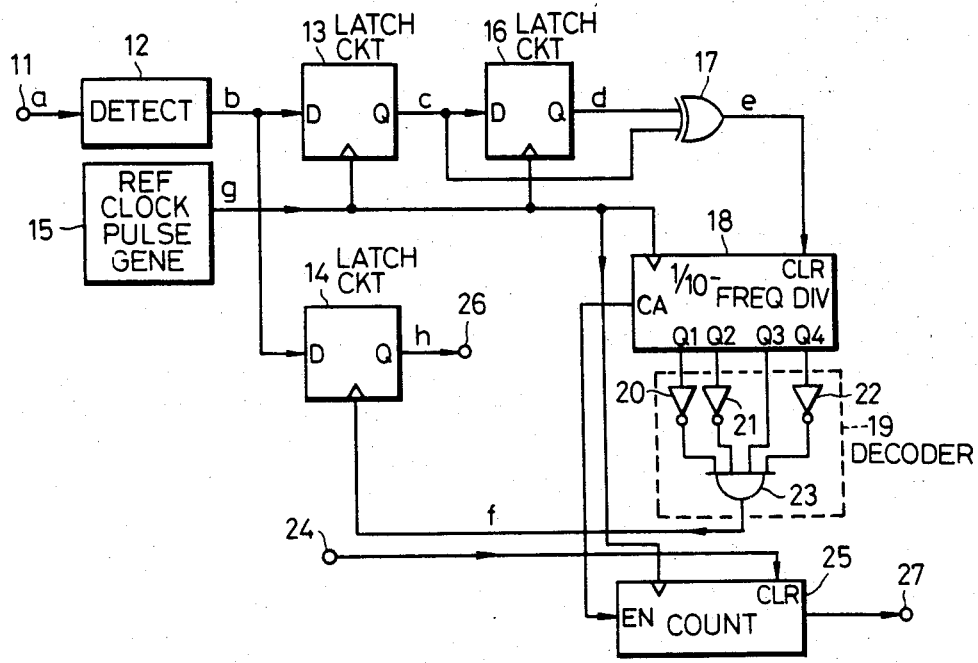
FIG. 1 is a systematic circuit diagram showing a first embodiment of a data reading apparatus for data transmission according to the present invention.
Figure 2:
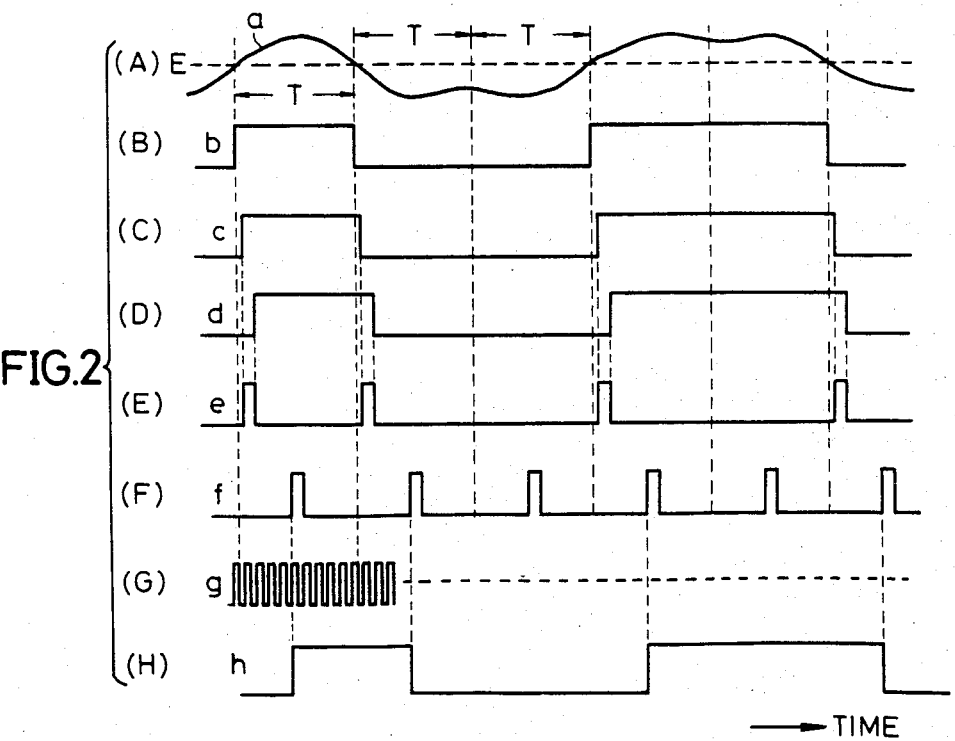
FIGS. 2(A) through 2(H) are graphs respectively showing signal waveforms at each part of the circuit system shown in FIG. 1.

In FIG. 1, an input signal a having a waveform shown in FIG. 2(A) is supplied to a detector 12 through a terminal 11. The level of the input signal a is compared with a reference level indicated by E in FIG. 2(A) at the detector 12. Here, the input signal a is a signal obtained by passing a digital signal series through a transmission path. The detector 12 produces a two-valued digital signal (detection signal) b shown in FIG. 2(B) as a result of the above level comparison. The digital signal b is applied to respective input terminals of a delay type flip-flops (hereinafter referred to as latch circuits) 13 and 14. A Q-output signal of the latch circuit 13 is applied to a data input terminal of a latch circuit 16. A reference clock pulse g from a reference clock pulse generator 15 is applied to respective clock input terminals of the latch circuits 13 and 16, a 1/10-frequency divider 18, and a counter 25. Description will be given on the frequency divider 18 and the counter 25 afterwards. The above reference clock pulse g is a rectangular wave having a period which is 1/10 of a digit period (hereinafter referred to as a bit period) T of the input signal a, as shown in FIGS. 2(G).

The latch circuit 13 obtains a pulse c shown in FIG. 2(C) by latching the detected digital signal b by a rising edge of the input reference clock pulse g, and supplies this pulse c to a data input terminal of the latch circuit 16 and to an input of an exclusive-OR circuit 17. The rising timing of this pulse c is not constant with respect to the rising timing of the digital signal b, and has a maximum delay equal to approximately one period of the reference clock pulse g. The latch circuit 16 produces a pulse d shown in FIG. 2(D) from a Q-output terminal by latching the pulse c by the rising edge of the reference clock pulse g, and supplies this pulse d to another input of the exclusive-OR circuit 17. Accordingly, the pulse d is delayed with respect to the pulse c by a delay time corresponding to one period of the reference clock pulse g. As a result, the exclusive-OR circuit 17 produces a pulse e shown in FIG. 2(E). As seen from FIG. 2(E), the pulse e has a pulse width corresponding to one period of the reference clock pulse g, and is produced for every rising and falling edges of the digital signal b. Because the above pulse e is produced in the vicinity of the rising and falling edges of the digital signal b, this pulse e is a level variation detection pulse (edge detection pulse) of the digital signal b. The level variation detection pulse e is applied to a clear input terminal of the 1/10-frequency divider 18, to clear the frequency divider 18 by the rising edge of the pulse e.

An integrated circuit chip SN74163 is used as the frequency divider 18, for example. The frequency divider 18 counts the reference clock pulse g, and supplies a resulting counted output to a decoder 19 from terminals Q1 through Q4. During an interval between a ninth incoming reference clock pulse g and a tenth incoming reference clock pulse g after the frequency divider 18 is cleared, the frequency divider 18 generates a signal having a repetition period equal to the above bit period T, and supplies this signal thus generated to an enable terminal EN of the counter 25 from a carry out terminal CA. The decoder 19 comprises inverters 20, 21, and 22, and a 4-input AND circuit 23. When the output terminals Q1, Q2, and Q4 of the frequency divider 18 are of low levels and only the output terminal Q3 produces a high-level signal, that is, when the frequency divider 18 counts four reference clock pulses g, all the four inputs of the AND circuit 23 become of high level. Accordingly, the AND circuit 23 produces a high-level signal f shown in FIG. 2(F), and supplies this signal f to a clock input terminal of the latch circuit 14 as a data reading timing clock pulse. This data reading timing clock pulse is generated with a phase corresponding to substantially the center of the bit period of the input signal a shown in FIG. 2(A). The digital signal b applied to the data input terminal of the latch circuit 14 is latched by the rising edge of the above data reading timing clock pulse f, and a pulse h shown in FIG. 2(H) thus obtained is supplied to an output terminal 26. As clearly seen by comparing FIGS. 2(A) and 2(H), the above pulse h is a reading data of the input signal a.

On the other hand, as described above, the input signal a is obtained in the following manner. That is, a digital data obtained by subjecting an analog information signal to digital pulse modulation is divided into predetermined sections, and a signal in each predetermined section is added with a synchronizing signal having a fixed pattern, and often further added with a code error detection signal and a code error correction signal. Then, the input signal a is obtained through a transmission path by transmitting the digital signal time serially. Therefore, the rising and falling edges of the input signal a are not sharp as shown in FIG. 2(A), due to high-frequency attenuation characteristic of the transmission path itself and the like. The input signal a is transmitted continuously succeeding the synchronizing signal, and the synchronizing signal is detected by a synchronizing signal detection circuit (not shown) by using the fixed pattern characteristic of the synchronizing signal. A detection signal of the synchronizing signal is applied to a clear terminal of the counter 25, through an input terminal 24.

During a period in which the input signal to the enable terminal EN is of high level, the counter 25 counts the incoming reference clock pulse g to the clock input terminal thereof. The resulting counted output is produced to an output terminal 27. The above period in which the input signal to the enable terminal EN of the counter 25 is of high level corresponds to the interval from the ninth incoming reference clock pulse g to the tenth incoming reference clock pulse g after the frequency divider 18 is cleared. However, the phase of the reference clock pulse g becomes slightly delayed due to delay introduced by circuit elements in the frequency divider 18. Accordingly, at the point when the above tenth reference clock pulse g is applied to the counter 25, the input signal to the enable terminal EN of the counter 25 is still of high level. Hence, the counter 25 counts one reference clock pulse g at this point. As a result, the output counted value of the counter 25 indicates the bit from which the data read at the latch circuit 14 is obtained, that is, how many bits after the synchronizing signal the bit containing the read data lies.

In the present embodiment of the invention, when there is an incoming digital signal b shown in FIG. 3(A) from the detector 12, the frequency divider 18 is cleared by the level variation detection pulse e shown in FIG. 3(B) which is in phase synchronism with the rising and falling edges of the digital signal b. Thus, the data reading timing clock pulse f produced by decoding the output signal of the frequency divider 18, is corrected of the phase every time the above level variation detection pulse e is applied to the frequency divider 18.

As opposed to the above embodiment, the conventional data reading apparatus is constructed as shown in FIG. 4. Accordingly, the phase of the data reading timing clock pulse could not be corrected as will be described hereinafter. In FIG. 4, those parts which are the same as those corresponding parts in FIG. 1 are designated by the same reference numerals, and their description will be omitted. In FIG. 4, the output digital signal of the detector 12 is applied to a data input terminal of a latch circuit 30. On the other hand, the incoming synchronizing signal detection signal to an input terminal 31 is applied to a clear terminal of a 1/10-frequency divider 33. This frequency divider 33 counts the reference clock pulse obtained from the reference clock pulse generator 15, and supplies a resulting counted output to the decoder 19. The frequency divider 33 and the decoder 19 constitute a data reading timing clock pulse generator 32. The data reading timing clock pulse produced from the decoder 19, is applied to a clock input terminal of the latch circuit 30.

Thus, in the conventional data reading apparatus, the frequency divider 33 is merely cleared for every incoming synchronizing signal. As a result, if the above digital signal includes jitter due to transmission as shown in FIG. 5(A), although the first data reading timing clock pulse after detection of the synchronizing signal is generated with a phase substantially at the center of the bit period of the digital signal as indicated by b1 in FIG. 5(B), the phase error of the data timing clock pulse with respect to the digital signal shown in FIG. 5(A) gradually increases every time the data reading timing clock pulse is generated, as indicated by b2, b3, b4, b5, b6, and b7 in FIG. 5(B). Eventually, the data reading timing clock pulse becomes generated at a bit adjacent to the bit which is to be read originally, as indicated by b6 in FIG. 5(B). Accordingly, the data reading output signal supplied to an output terminal 34 from a Q-output terminal of the latch circuit 30 becomes as shown in FIG. 5(C). In this case, the information produced is completely different from the data information of the original digital signal shown in FIG. 5(A).

However, in the data reading apparatus according to the present invention, the phase of the data reading timing clock pulse f is corrected every time there is an incoming level variation detection pulse e to the frequency divider 18. Accordingly, an erroneous operation such as reading of data from a bit adjacent to the bit which is to be read originally, is positively prevented.

The digital data can be read correctly by the output signal of the frequency divider 18 obtained through the decoder 19, even if the period of the reference clock pulse produced from the reference clock pulse generator 15 is longer than 1/10 the bit period T.

Figure 6:
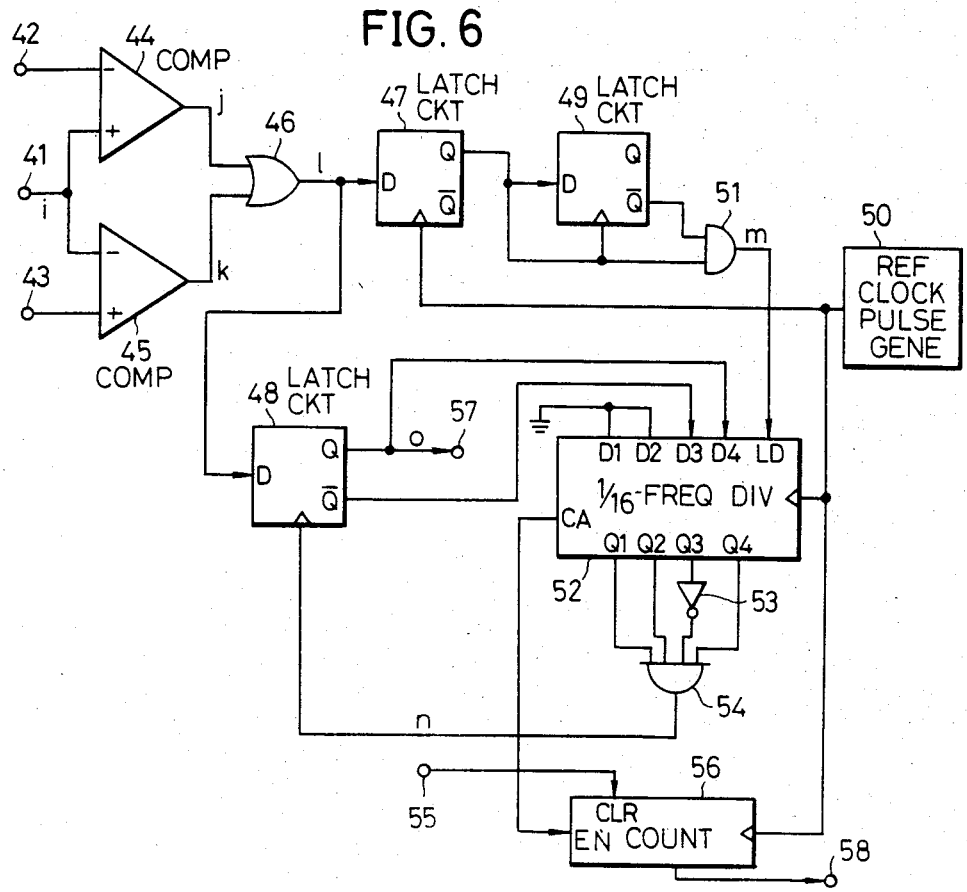
FIG. 6 is a systematic circuit diagram showing a second embodiment of a data reading apparatus according to the present invention.
Figure 7:
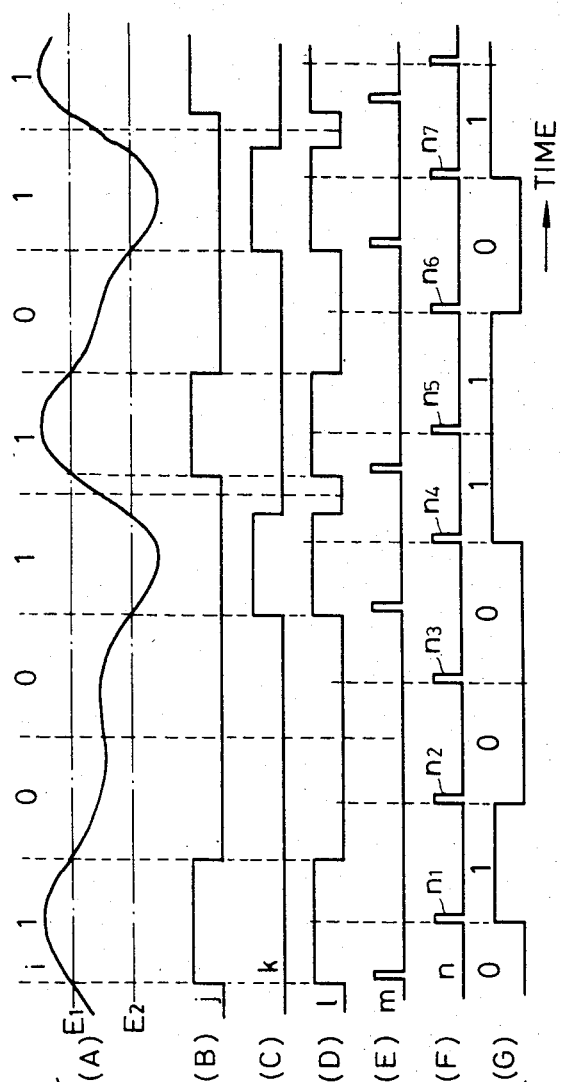
FIGS. 7(A) through 7(G) are graphs respectively showing signal waveforms at each part of the circuit system shown in FIG. 6.

Next, description will be given with respect to a second embodiment of a data reading apparatus according to the present invention. In FIG. 6, an incoming three-valued code (sign) signal i shown in FIG. 7(A) to an input terminal 41, is supplied to a non-inverting input terminal of a comparator 44 and an inverting input terminal of a comparator 45. The three-valued code signal i is a signal transmitted according to the partial response system. This partial response system is known as one of the digital transmission systems. A two-valued code signal to be transmitted, is converted into another two-valued code signal (non-return to zero inverted (NRZI) signal, for example) according to the above partial response system by considering the characteristics of a magnetic head and a magnetic recording medium which constitute the transmission path, and then recorded onto the magnetic recording medium. When this magnetic recording medium is reproduced by the magnetic head, the low-frequency component close to the DC component is greatly attenuated due to the differentiating characteristic according to the winding in the magnetic head. Further, the high-frequency component is also attenuated. Accordingly, the reproduced signal waveform has a signal level corresponding to a level "+1" at the rising edge of the recorded two-valued code signal, and a signal level corresponding to "−1" at the falling edge of the recorded two-valued code signal, and a signal level "0" at a recorded two-valued code signal part where the level "0" or "1" is continuously obtained for an interval over two bit periods, and has a waveform of a three-valued code signal. In order to form this reproduced three-valued code signal into a three-valued code signal in accordance with the partial response system, high-frequency compensation is performed at an equalizer. A reproduced signal obtained from this equalizer is the three-valued code signal i shown in FIG. 7(A). In FIG. 7(A), numerals above the waveform indicate the value of the two-valued code signal which is to be recorded.

On the other hand, a first reference voltage indicated by E1 in FIG. 7(A) is applied to an inverting input terminal of the comparator 44 from an input terminal 42. In addition, a second reference voltage indicated by E2 in FIG. 7(A) is applied to a non-inverting input terminal of the comparator 45 from an input terminal 43. The first reference voltage is selected to an intermediate level between a peak level of a signal corresponding to the level "0" of the three-valued code signal i and a peak level of a signal corresponding to the level "+1" of the three-valued code signal i. The second reference voltage is selected to an intermediate level between a peak level of a signal corresponding to the level "0" of the three-valued code signal i and a peak level of a signal corresponding to the level "−1" of the three-valued code signal i.

Accordingly, a two-valued square wave j shown in FIG. 7(B) is obtained from the comparator 44 shown in FIG. 6. This square wave j has a signal level "+1" within an interval corresponding to the signal level "+1" of the input three-valued code signal i, and has a signal level "0" within intervals corresponding to the signal levels "−1" and "0" of the input three-valued code signal i. On the other hand, a two-valued square wave k shown in FIG. 7(C) is obtained from the comparator 45. This square wave k has a signal level "+1" within an interval corresponding to the signal level "−1" of the three-valued code signal i, and has a signal level "0" within intervals corresponding to the signal levels "+1" and "0" of the three-valued code signal i. An OR circuit 46 obtains a logical sum of the above square waves j and k, and produces a square wave l shown in FIG. 7(D). This square wave l is applied to respective data input terminals of latch circuits 47 and 48 as level detection signals.

A signal obtained from a Q-output terminal of the latch circuit 47 is applied to a data input terminal of a latch circuit 49. A reference clock pulse having a period which is 1/10 the bit period of the three-valued code signal i is obtained from a reference clock pulse generator 50, and applied to respective clock input terminals of the latch circuits 47 and 49. The signal from the Q-output terminal of the latch circuit 47 and a signal from a $\bar{Q}$-output terminal of the latch circuit 49 are respectively supplied to an AND circuit 51. This AND circuit 51 produces a pulse m shown in FIG. 7(E). This pulse m is in phase synchronism with the rising edge of the level detection signal l as seen from FIGS. 7(D) and 7(E). The above pulse m is applied to a load terminal LD of a 1/16-frequency divider 52 as a level variation detection pulse. The phase error between the rising edge of the pulse m and the level detection signal l is not constant, and the rising edge of the pulse m is delayed with respect to the rising edge of the level detection signal l by a delay approximately equal to one period of the reference clock pulse at the maximum.

For example, an integrated circuit chip LS163 can be used as the above 1/16-frequency divider 52. Among preset data input terminals D1 through D4 (D1 is the least significant bit, and D4 is the most significant bit) of the frequency divider 52, the terminals D1 and D2 are applied with a low-level voltage. The terminals D3 and D4 of the frequency divider 52 are respectively connected to the $\bar{Q}$-output and Q-output terminals of the latch circuit 48. The above frequency divider 52 counts the reference clock pulse obtained from the reference clock pulse generator 50, and produces the counted output through the terminals Q1 through Q4. Moreover, a pulse which becomes of high level when the counted value becomes "15" and becomes of low level with the incoming sixteenth reference clock pulse, that is, a pulse obtained by frequency-dividing the frequency of the reference clock pulse into 1/16 the original frequency, is produced from a carry out terminal CA of the frequency divider 52. This pulse from the terminal CA is applied to an enable terminal EN of a counter 56. Because the period of the reference clock pulse is selected to 1/16 the bit period, the period of the pulse obtained from the terminal CA of the frequency divider 52 is 1/16 the bit period.

When the output signals from the terminals Q1, Q2, and Q4 of the frequency divider 52 respectively are of a logic level "1" and the output signal from the terminal Q3 is of a logic level "0", that is, when the counted value is "11", the output signal from the terminal Q3 is supplied to a 4-input AND circuit 54 through an inverter 53 while the output signals from the terminals Q1, Q2, and Q4 are directly supplied to the AND circuit 54. This AND circuit 54 produces a pulse n having a waveform shown in FIG. 7(F). The pulse n is applied to a clock input terminal of the latch circuit 48 as the data reading timing clock pulse. Thus, the latch circuit 48 latches the level detection signal l by the rising edge of the pulse n, and produces a signal hence obtained through an output terminal Q while a signal of an inverted phase is produced through an output terminal $\bar{Q}$. A pulse o shown in FIG. 7(G) is supplied to an output terminal 57 from the output terminal Q, as the data reading signal. This data reading signal o has a signal level "+1" with respect to the levels "+1" and "−1" of the three-valued code signal i, and has a level "0" with respect to the level "0" of the three-valued code signal i, and accordingly indicates the original data.

On the other hand, the counter 56 is cleared by the synchronizing signal detection signal obtained from a terminal 55, and counts the reference clock pulse during the interval in which there is an incoming high-level signal to the enable terminal EN thereof. Because the pulse having a period equal to 1/16 the bit period is applied to the enable terminal EN of the counter 56, the counter 56 produces a counted value to an output terminal 58. As in the case of the above described counter 25, the output counted value from the counter 56 indicates the bit from which the data read at the latch circuit 48 is obtained, that is, how many bits after the synchronizing signal the bit containing the read data lies.

By comparing the three-valued code signal i shown in FIG. 7(A) and the level detection signal l shown in FIG. 7(D), it is seen that the rising edge of the level detection signal l occurs when the signal level of the three-valued code signal i becomes "+1" or "−1". When the signal level of the three-valued code signal i in a bit period immediately preceding the bit period of the data reading signal produced from the terminal Q of the latch circuit 48 is "0", the rising edge of the level detection signal l occurs faster compared to the case where signal level of the three-valued code signal i in the immediately preceding bit period is "−1" or "+1". Accordingly, because the level variation detection pulse m is also generated in phase synchronism with the rising edge of the level detection signal l, the level variation detection pulse m is generated with a different timing according to whether the signal level of the three-valued code signal i in the above immediately preceding bit period is "0" or "−1" (or "+1").

Hence, if the frequency divider 52 always assumes the same reset value (preset data value) and the data reading timing clock pulse is generated from the counted output signal of the frequency divider 52, the data reading by the latch circuit 48 is not performed at substantially the center of the bit period according to the value of the bit immediately preceding the data.

Therefore, in order to prevent the above phenomenon, the output signal o from the terminal Q of the latch circuit 48 is applied to the preset data input terminal D4 of the frequency divider 52 in the present embodiment. Moreover, the output signal from the terminal $\bar{Q}$ of the latch circuit 48 is applied to the preset data input terminal D3 of the frequency divider 52. Thus, when the data reading signal o is of low level, the input level at the terminals D1, D2, and D4 respectively become of low level, while the input level at the terminal D3 becomes of high level. In this state, if there is an incoming level variation detection pulse m to the frequency divider 52, a value "4" is set in the frequency divider 52. On the other hand, when the data reading signal o is of high level, a value "8" is set in the frequency divider 52 if there is an incoming level variation detection pulse m. If the data reading signal o is of low level at a point in time when the level variation detection pulse m is generated, the data in the immediately preceding bit is "0", and on the other hand, if the data reading signal o is of high level, the data in the immediately preceding bit is "1", as shown in FIGS. 7(A) through 7(G).

Accordingly, in the present embodiment, if the data in the immediately preceding bit is "0", the value "4" is set upon resetting of the frequency divider 52. Then, when the counted value reaches a value "11", the data reading timing clock pulse n is generated in a relatively delayed manner as indicated by n1, n4, and n7 in FIG. 7(F). On the other hand, if the data in the immediately preceding bit is "1", the value "8" is set upon resetting of the frequency divider 52. Then, in this case, when the counted value reaches the value "11", the data reading timing clock pulse n is generated in a relatively advanced manner as indicated by n5 in FIG. 7(F).

The data reading timing clock pulses indicated by n2, n3, and n6 in FIG. 7(F) are generated every time the frequency divider 52 counts sixteen reference clock pulses.

Therefore, according to the present embodiment, the phase of the data reading timing clock pulse n is corrected for every rising edge in the level detection signal l, and the data is prevented from being read erroneously due to jitter. In addition, the timing with which the data reading timing clock pulse n is generated is varied according to the data in the immediately preceding bit of the level detection signal l. Hence, the data can be read accurately at substantially the center of the bit period of the level detection signal l.

Figure 9:
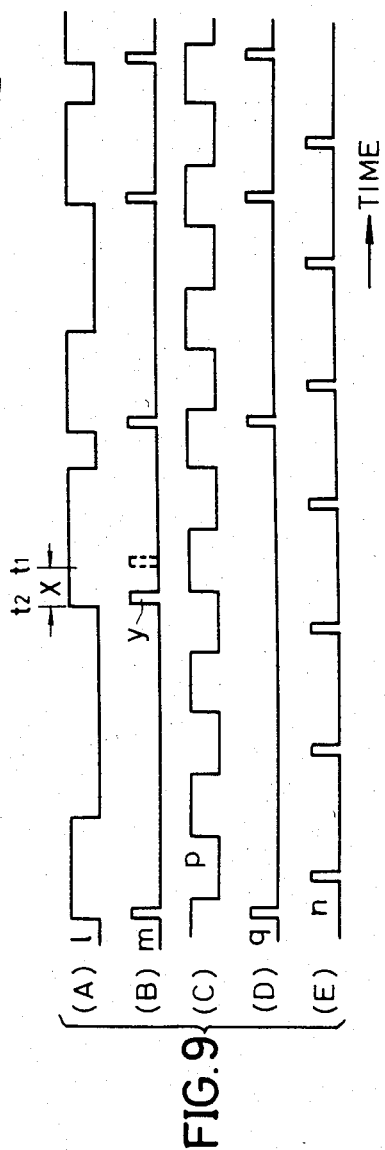
FIGS. 9(A) through 9(E) are graphs respectively showing signal waveforms at each part of the circuit system shown in FIG. 8.

However, in the above second embodiment shown in FIG. 6, if the rising edge in the level detection signal l shown in FIG. 7(D) is generated at a point t2 shown in FIG. 9(A) shifted from an original rising timing point t1 by a time x due to noise, level variation, and the like introduced in the transmission system, for example, the level variation detection pulse m also becomes generated at a shifted point as indicated by a pulse y in FIG. 9(B). Hence, if the frequency divider 52 is reset by the phase-shifted level variation detection pulse y, the frequency divider 52 may thereafter generate the data reading timing clock pulse with a shifted phase until the frequency divider 52 is correctly reset.

Figure 10:
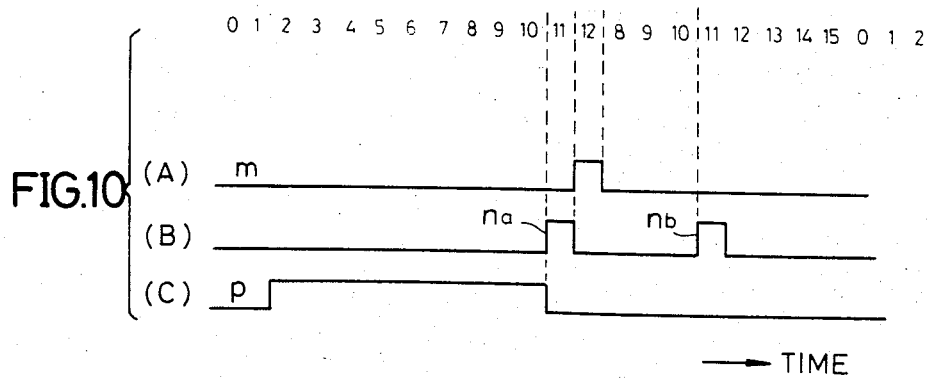
FIGS. 10(A) through 10(C) are graphs respectively showing another example of signal waveforms at each part of the circuit system shown in FIG. 8.

In addition, in the second embodiment, the frequency divider 52 is set with a preset data by the level variation detection pulse m (that is, "reset"). Accordingly, during an interval between one reset point and another reset point, the data reading timing pulse n may be generated twice. That is, a case may occur where the data reading timing clock pulse n is generated when the counted value in the frequency divider 52 is "11" as indicated by na in FIG. 10(B), the level variation detection pulse m is generated when the counted value in the frequency divider 52 is "12" as shown in FIG. 10(A), and the frequency divider 52 is accordingly preset with a value "8". In FIG. 10(A), numerals shown above the waveform indicates the counted value in the frequency divider 52.

In this case, the frequency divider 52 starts counting from the value "8". Accordingly, the counted value "11" is obtained at a point before the succeeding level variation detection pulse m is generated. As a result, a data reading timing clock pulse nb shown in FIG. 10(B) is generated. That is, because the minimum pulse interval of the level variation detection pulse m is equal to an one bit period required for counting sixteen reference clock pulses, the two data reading timing clock pulses na and nb shown in FIG. 10(B) are generated within this pulse interval.

Figure 8:
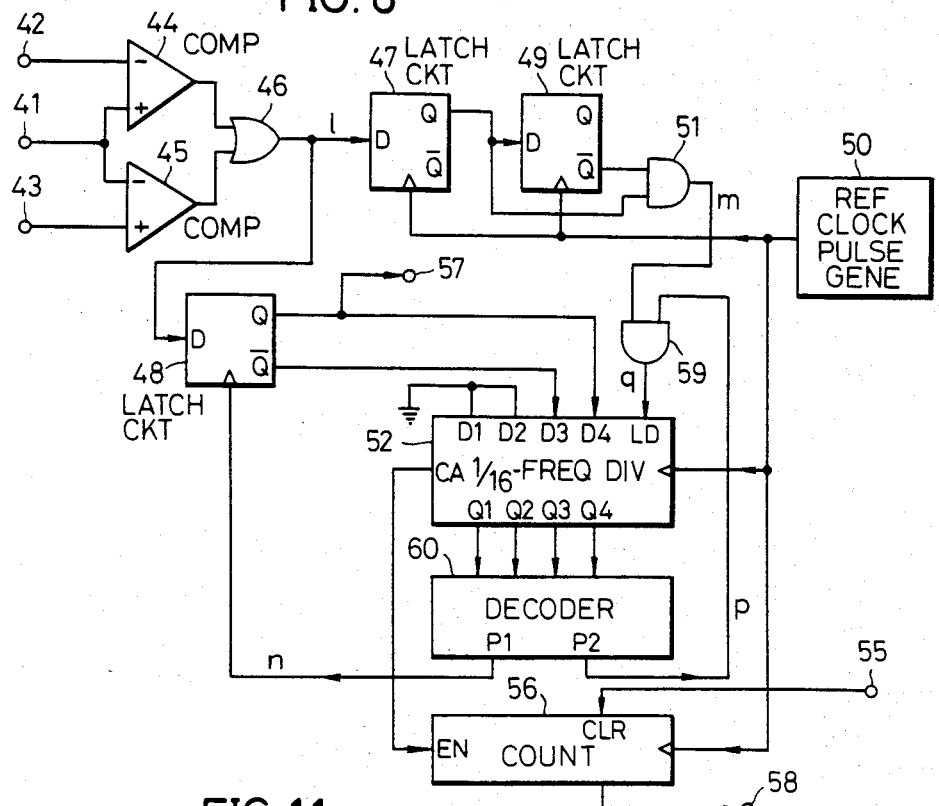
FIG. 8 is a systematic circuit diagram showing a third embodiment of a data reading apparatus according to the present invention.

The above described phenomenon is prevented from occurring in a third embodiment of a data reading apparatus according to the present invention shown in FIG. 8. In FIG. 8, those parts which are the same as those corresponding parts in FIG. 6 are designated by the same reference numerals, and their description will be omitted. In FIG. 8, a decoder 60 is supplied with the signals from the counted output terminals Q1 through Q4 of the frequency divider 52. When the counted value in the frequency divider 52 is "11", for example, the decoder 60 produces a data reading timing clock pulse n shown in FIG. 9(E) through a terminal P1, and produces a pulse p shown in FIGS. 9(C) and 10(C) through a terminal P2. The pulse p is of high level as shown in FIG. 10(C) during an interval wherein the counted value in the frequency divider 52 assumes a value from "2" to "10". A normal level variation detection pulse m is generated within the above interval where the counted value in the frequency divider 52 assumes a value from "2" to "10".

The pulse p is supplied to an AND circuit 59, together with the level variation detection pulse m. Accordingly, a signal applied to the load terminal LD of the frequency divider 52 from the AND circuit 59, becomes as indicated by q in FIG. 9(D). That is, the level variation detection pulse y shown in FIG. 9(B) which is generated with an abnormal phase is eliminated, and only the level variation detection pulse generated with the normal phase is applied to the load terminal LD of the frequency divider 52 to reset the frequency divider 52. Therefore, the above described erroneous operation is prevented from being performed.

Figure 11:
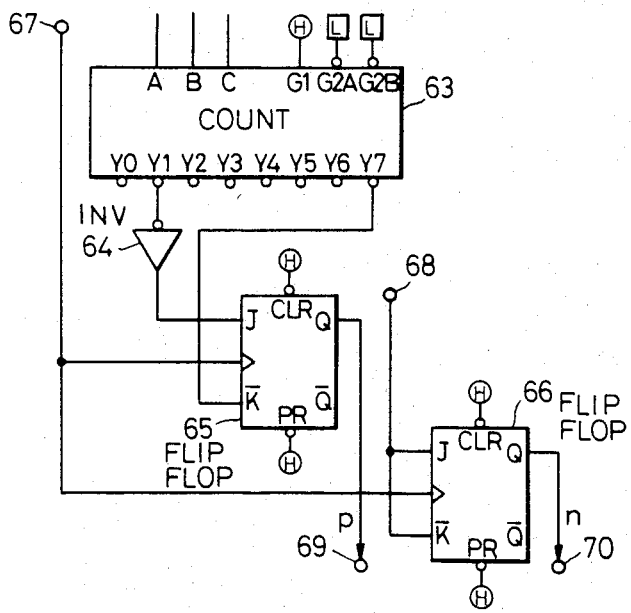
FIG. 11 is a circuit diagram showing an embodiment of a decoder in the circuit system shown in FIG. 8.

The decoder 60 has a circuit construction shown in FIG. 11. In FIG. 11, an integrated circuit chip LS138 may be used as a counter 63. Counted output signals of three bits, excluding the least significant bit, of a 1/15-frequency divider (not shown) corresponding to the above 1/16-frequency divider 52, are respectively applied to input terminals A, B, and C of the counter 63. In FIG. 11, a reference character "H" indicates a high-level voltage, and a reference character "L" indicates a low-level voltage. When a low-level voltage is applied to all the input terminals A, B, and C of the counter 63, a low-level voltage is produced from only an output terminal Y0 from among output terminals Y0 through Y7. The other output terminals Y1 through Y7 produce high-level voltages. On the other hand, if only the input terminal B among the input terminals A, B, and C is applied with a high-level voltage, a low-level voltage is produced from only the output terminal Y1. In this case, the other output terminals Y0 and Y2 through Y7 produce high-level voltages. Similarly, if high-level voltages are respectively applied to the input terminals A, B and C of the counter 63, a low-level voltage is only obtained from the output terminal Y7, and a high-level voltage is respectively obtained from the remaining output terminals Y0 through Y7.

The signal obtained from the output terminal Y1 of the counter 63 is applied to an input terminal J of a J-K flip-flop 65, through an inverter 64. In addition, the output signal from the output terminal Y7 is applied to an input terminal $\overline{K}$ of the J-K flip-flop 65. The incoming reference clock pulse to a terminal 67 is applied to respective clock input terminals of the J-K flip-flops 65 and 66. Accordingly, the pulse p shown in FIGS. 9(C) and 10(C) is obtained from an output terminal Q of the flip-flop 65, and this pulse p is supplied to an output terminal 69. An output signal from a carry out terminal of the above 1/15-frequency divider is applied to input terminals J and $\overline{K}$ of the flip-flop 66. Thus, a data reading timing clock pulse shown in FIG. 10(E) is produced from an output terminal Q of the flip-flop 66, and supplied to an output terminal 70.

The above description was made with respect to the reading of data in a non-self-clocked digital signal series such as a NRZ signal or a NRZI signal. However, the data reading apparatus according to the present invention can also be applied similarly to a self-clocked digital signal series such as a modified frequency modulation (MFM) signal or a phase encoding (PE) signal obtained by performing modified frequency modulation or phase encoding, by adding slight modification. For example, when reading data in an MFM signal, the repetition period of the reference clock pulse is selected to 1/20 the bit period of the MFM signal. Further, an MFM decoding circuit is added to an output stage of the output terminal 26 or 57.

Moreover, an exclusive-OR can be obtained between a non-self-clocked digital signal series and a random code series such as a separately generated M-series code. In this case, the apparatus according to the present invention can be applied to a randomized digital signal series in which the non-self-clocked digital signal series is randomized so that the rate of continuous logic "0" or "1" is reduced.

The present invention is not limited to the application to the two-valued code transmission and three-valued code transmission as described in the above embodiments, but can also be applied to four-valued code and eight-valued code transmission systems and the like. Generally, in an N-valued (M is an integer) code transmission, there are (M-1) kinds of reset values upon resetting of the frequency divider by the level variation detection pulse.

In addition, according to the apparatus of the present invention, the correct reading timing clock for each bit (or each digit) can be obtained even if the timing control is not performed by detecting the synchronizing signal. Thus, the apparatus may be used for detecting the data pattern of the synchronizing signal which has an arbitrarily fixed data pattern. For example, if the synchronizing signal consists of eight bits of data, the read 8-bit data can be stored into a register and the like, to detect the pattern.

Further, the present invention is not limited to these embodiments, but various variations and modifications may be made without departing from the scope of the present invention.

What is claimed is:

1. A data reading apparatus for data transmission, for reading digital data from a digital signal series obtained by comparing the level of an incoming transmission signal obtained through a transmission path with a reference level at a detector, said data reading apparatus comprising:
a reference clock pulse generator for generating a reference clock pulse having a period equal to substantially 1/M (M is an integer greater than or equal to two) of a transmission digit period of said digital signal series;
detecting means supplied with said digital signal series and said reference clock pulse generated by said reference clock pulse generator, for generating a level variation detection pulse in phase synchronism with level varying points corresponding to rising edges and/or falling edges of said digital signal series;
frequency dividing means reset by said level variation detection pulse from said detecting means, for generating a data reading timing clock pulse with a period substantially equal to the digit period of said digital signal series and with a phase delayed with respect to said level variation detection pulse, by frequency-dividing said reference clock pulse from said reference clock pulse generator; and
a data reading circuit for obtaining a data reading output signal by latching said digital signal series by said data reading timing clock pulse obtained from said frequency dividing means, said frequency dividing means comprising phase controlling means for generating said data reading timing clock pulse variably controlled of a phase delay quantity with respect to said level variation detection pulse, according to a value of the data reading output signal in a digit immediately preceding a digit from which the data reading output signal of said digital signal series is obtained.

4. A data reading apparatus as claimed in claim 1 in which said frequency dividing means comprises a 1/M-frequency divider supplied with said reference clock pulse to a clock input terminal thereof and supplied with said level variation detection pulse to a load terminal thereof, and a decoder for generating said data reading timing clock pulse when an output of said 1/M-frequency divider becomes a predetermined value, and said phase controlling means comprises means for applying said data reading output signal from said data reading circuit and a signal of a constant value to preset data input terminals of said 1/M-frequency divider.

2. A data reading apparatus as claimed in claim 1 in which said frequency dividing means comprises a 1/M-frequency divider supplied with said reference clock pulse to a clock input terminal thereof, a decoder for generating said data reading timing clock pulse when an output signal of said 1M-frequency divider becomes a first counted value, and for generating a gating signal when the output signal of said 1/M-frequency divider indicates counted values corresponding to a predetermined interval in which said level variation detection pulse is generated with normal phase, and a gate circuit supplied with said gating signal and said level variation detection pulse, for passing and supplying said level variation detection pulse to a clear terminal or a load terminal of said 1/M-frequency divider only during an interval in which said gating signal is supplied to said gate circuit.

3. A data reading apparatus as claimed in claim 1 in which further comprises a counter cleared by a synchronizing signal detection pulse obtained by detecting a synchronizing signal within said digital signal series, supplied with a frequency-divided pulse obtained by frequency-dividing said reference clock pulse by said frequency dividing means to an enable terminal thereof, said frequency-divided pulse having a period substantially equal to the transmission digit period of said digital signal series, and supplied with said reference clock pulse to a clock pulse input terminal thereof.

* * * * *